(12) United States Patent
Erickson

(10) Patent No.: US 7,905,677 B1
(45) Date of Patent: Mar. 15, 2011

(54) POLE ASSEMBLY

(75) Inventor: Mark T. Erickson, Willmar, MN (US)

(73) Assignee: Uncommon USA, Inc., Willmar, MN (US)

( * ) Notice: Subject to any disclaimer, the term of this patent is extended or adjusted under 35 U.S.C. 154(b) by 0 days.

(21) Appl. No.: 12/288,303

(22) Filed: Oct. 20, 2008

Related U.S. Application Data

(62) Division of application No. 11/728,602, filed on Mar. 27, 2007.

(60) Provisional application No. 60/789,293, filed on Mar. 31, 2006.

(51) Int. Cl.
*F16B 7/10* (2006.01)

(52) U.S. Cl. ............... 403/379.3; 403/292; 403/362; 248/529; 248/539

(58) Field of Classification Search ............ 403/292, 403/293, 294, 297, 362, 377, 378, 379.3; D11/181; 285/404, 90, 397, 31; 52/843, 52/852; 248/511, 529, 533, 539; 411/535, 411/546

See application file for complete search history.

(56) References Cited

U.S. PATENT DOCUMENTS

| 51,910 A | * | 1/1866 | Barbaroux | ............ 285/404 |
| 859,233 A | | 7/1907 | Lane | |
| 1,102,413 A | | 7/1914 | Jensen | |
| 2,850,304 A | | 9/1958 | Wagner | |
| 3,000,656 A | | 9/1961 | Hollaender | |
| 3,103,375 A | | 9/1963 | McMullin | |
| 3,342,511 A | | 9/1967 | Galloway | |
| 3,417,732 A | | 12/1968 | Platt, Jr. | |
| 3,602,531 A | | 8/1971 | Patry | |
| 4,918,896 A | | 4/1990 | Wiese | |
| 4,949,525 A | | 8/1990 | Weaver | |
| 5,149,149 A | * | 9/1992 | Wu | ............... 403/292 |
| 5,363,607 A | * | 11/1994 | Turturro | ................ 52/40 |
| 5,605,410 A | | 2/1997 | Pantev | |
| 5,704,728 A | * | 1/1998 | Chan | ............... 403/292 |
| 6,273,634 B1 | | 8/2001 | Lohbeck | |
| 7,156,114 B2 | * | 1/2007 | Lo | ............... 403/292 |
| 7,186,050 B2 | * | 3/2007 | Dean et al. | ............ 403/344 |
| 7,240,928 B2 | | 7/2007 | Evans et al. | |

* cited by examiner

*Primary Examiner* — Michael P Ferguson
(74) *Attorney, Agent, or Firm* — Richard John Bartz

(57) ABSTRACT

A flagpole having a plurality of linear tubular members with ends of adjacent tubular members connected with coupling members including arcuate segments retained in tight surface engagement with inside surfaces of the tubular members with fasteners and a coupling assembly having a cone-shaped body and a sleeve connecting tubular members.

10 Claims, 7 Drawing Sheets

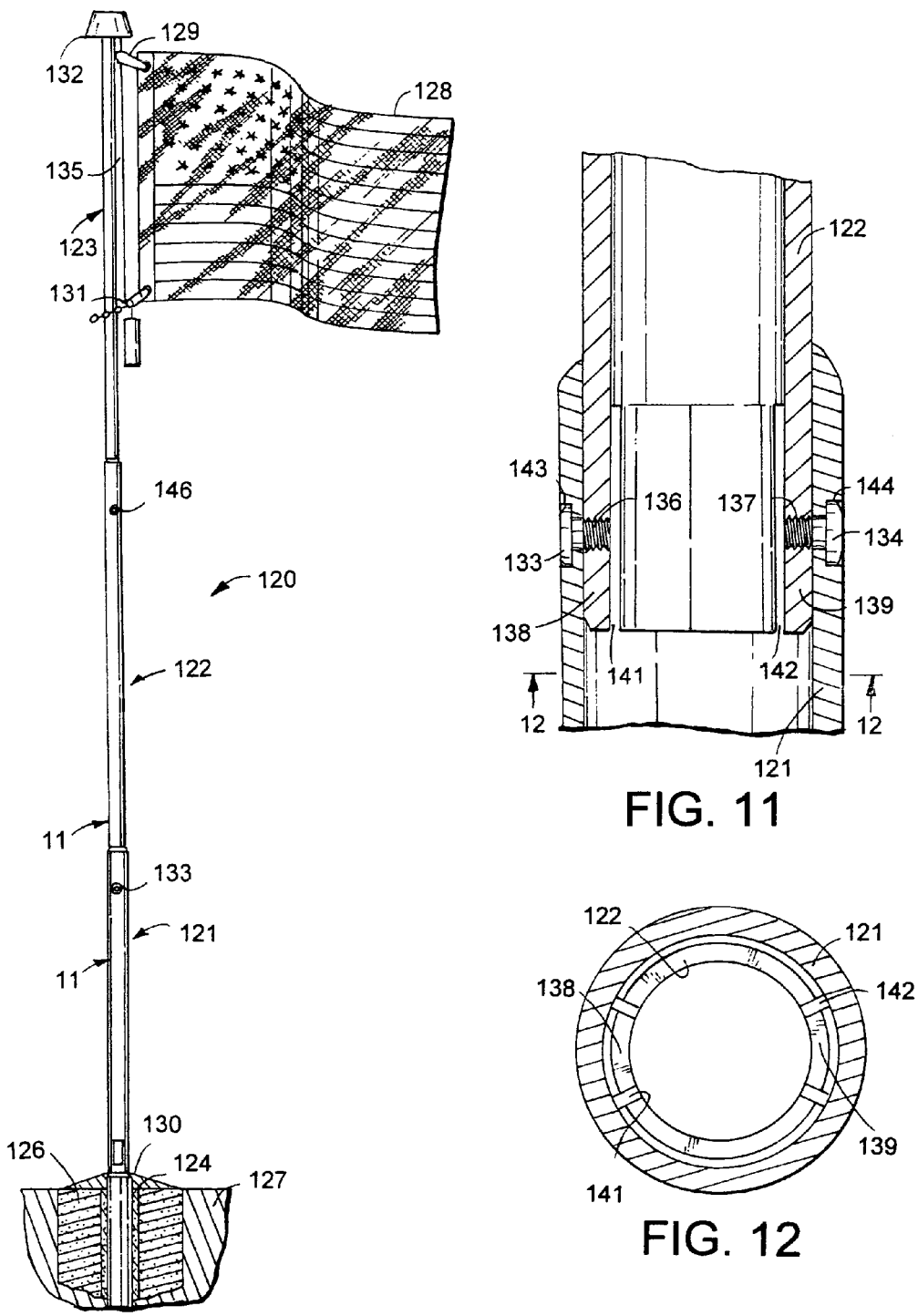

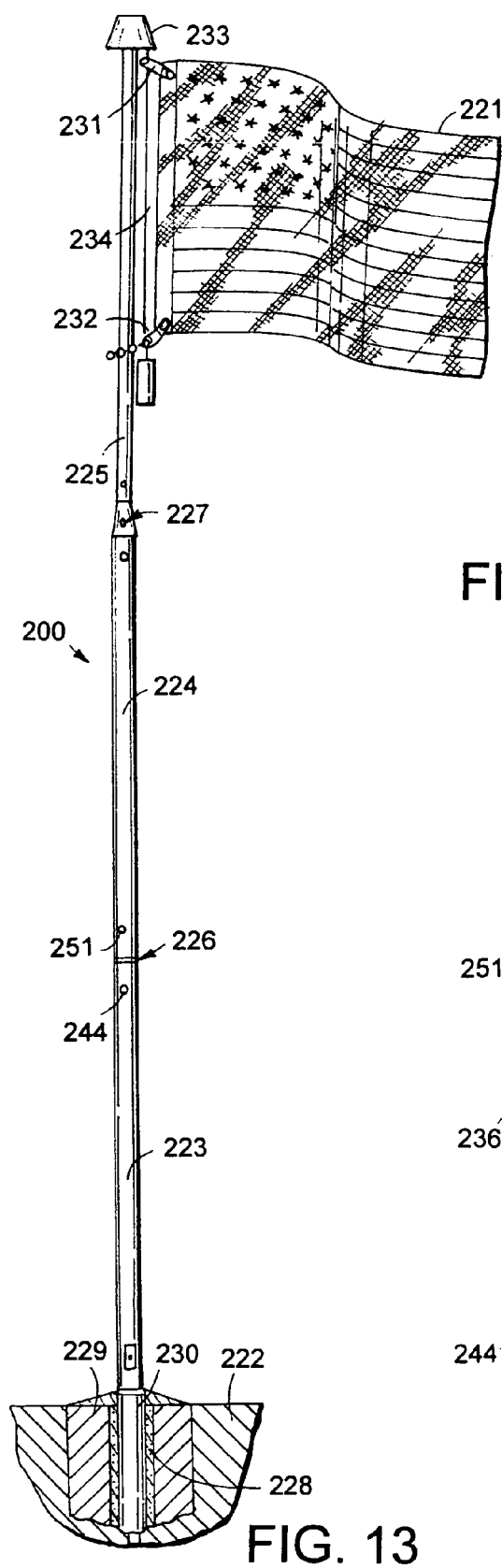
FIG. 13
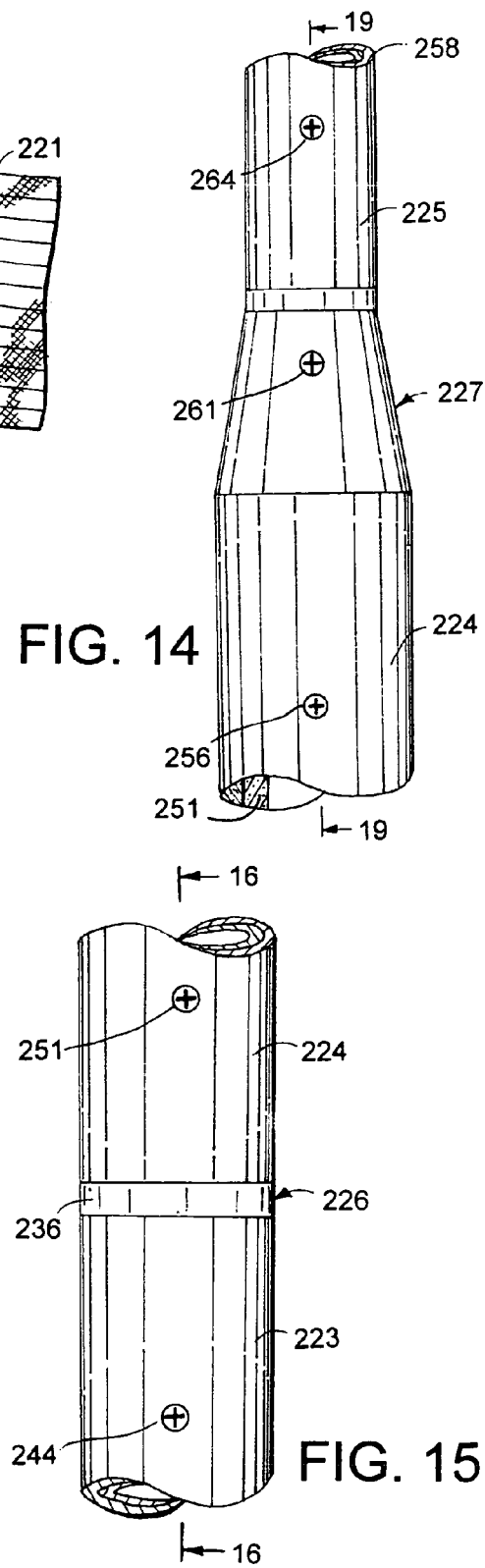
FIG. 14
FIG. 15

POLE ASSEMBLY

CROSS REFERENCE TO RELATED APPLICATIONS

This application is a division of U.S. application Ser. No. 11/728,602 filed Mar. 27, 2007. Application Ser. No. 11/728,602 claims the priority benefit of U.S. Provisional Application Ser. No. 60/789,293 filed Mar. 31, 2006.

FIELD OF THE INVENTION

The invention is in the art of connecting devices for joining tubular members. The particular connecting device is a tubular connector for connecting adjacent ends of tubular members of an upright pole assembly. The pole assembly can be a flagpole or sailboat mast.

BACKGROUND OF THE INVENTION

Tubular members and pipes are connected with threaded couplings and sleeves to retain the tubular members in end-to-end relationship. An example of a flagpole having a coupling thread on sleeves inserted into adjacent ends of metal pipe sections is disclosed by N. A. Jensen in U.S. Pat. No. 1,102,413. The adjacent ends of the pipe sections are shrunk onto cylindrical studs having threaded outer ends accommodating the coupling. The coupling accommodates different diameter pipe sections. A flagpole having linear tubular members connected with splicing sleeves tightly inserted into adjacent ends of the tubular members and secured to the tubular members with nut and bolt assemblies is disclosed by J. H. Weaver in U.S. Pat. No. 4,949,525. The sleeves and studs are cylindrical tubes that do not compensate for dimensional tolerances of the linear tubular members. Telescoping poles having a plurality of tubular progressively smaller size sections locked together with spring biased pins are disclosed by E. L. McMullin in U.S. Pat. No. 3,103,375. The pins are located in passages within plugs disposed in the lower ends of the tubular sections. The pins do not bias adjacent end sections together and compensate for dimensional tolerances of the tubular sections. A similar telescopic retractable pole having guides to facilitate movement of tubular segments and spring biased locking pins is disclosed by H. Wiess in U.S. Pat. No. 4,918,896.

SUMMARY OF THE INVENTION

The pole assembly of the invention has a plurality of linear tubular members joined in end-to-end relationship to provide an upright pole, such as a flagpole. Coupling members having external annular rings which engage adjacent ends of the tubular members function to secure the tubular members together and stabilize the joined tubular members. The coupling members have opposite segments biased into tight surface engagement with the tubular members with fasteners, such as bolts, that connect opposite ends of tubular members to the coupling members and compensate for dimensional tolerances of the tubular members and coupling members. A first embodiment of the pole assembly has a plurality of linear tubular members having adjacent ends telescoped together. The inside ends of the tubular members having separated arcuate segments that are biased with fasteners into tight surface engagement with the insides of the outer tubular members to connect the tubular members and compensate for dimensional tolerances of the tubular members. A second embodiment of the pole assembly has a plurality of first tubular members connected end-to-end with a first coupling member. Fasteners mounted on the tubular members engage the first coupling to retain the tubular members on the first coupling member. A combined second coupling member and sleeve connects an end portion of one tubular member to a second tubular member having an outside diameter smaller than the outside diameters of the first tubular members. The second coupling member has a body with a cone-shaped outside wall and a cylindrical member telescoped into an end portion.

DESCRIPTION OF THE DRAWING

FIG. 10 is a front elevational view, partly sectional, of a first modification of the flagpole of FIG. 1 having a plurality of linear tubular members connected together with fasteners;

FIG. 11 is an enlarged sectional view taken along the line 11-11 of FIG. 10;

FIG. 12 is a sectional view taken along the line 12-12 of FIG. 11;

FIG. 13 is a front elevational view, partly sectioned, of a second modification of the flagpole of FIG. 1 having a plurality of linear tubular members connected with coupling members;

FIG. 14 is an enlarged elevational view of a portion of adjacent tubular members connected with a straight coupling member;

FIG. 15 is an enlarged elevational view of a portion of adjacent tubular members connected with a tapered coupling member;

DESCRIPTION OF EMBODIMENTS OF THE INVENTION

Figure 1:
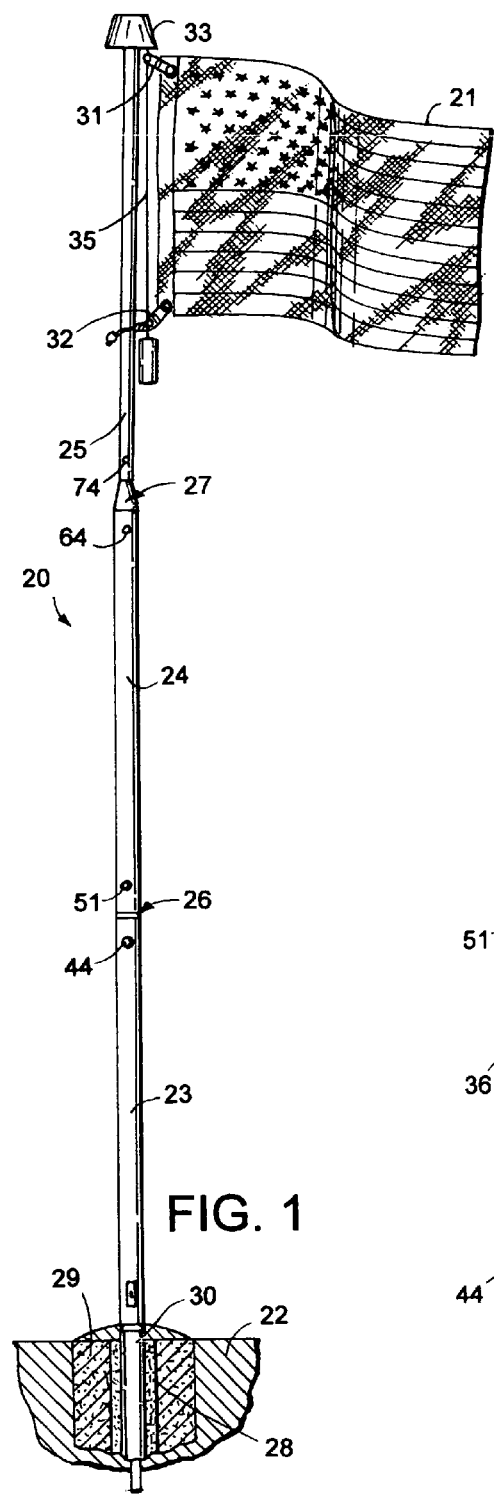
FIG. 1 is an elevational view, partly sectioned, of a flagpole having tubular members connected end-to-end with coupling members.
Figure 2:
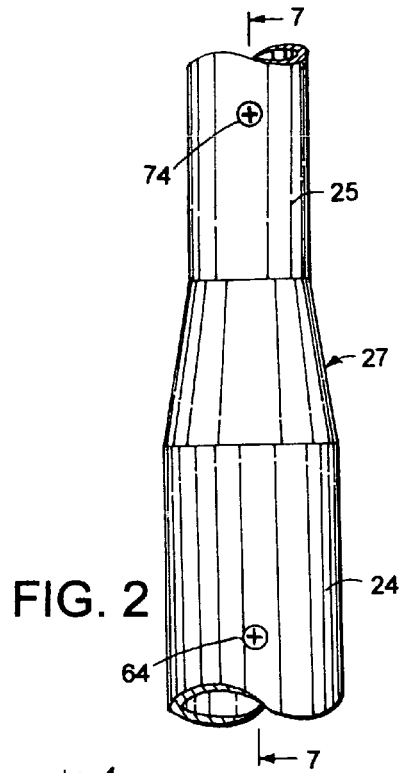
FIG. 2 is an enlarged elevational view of a portion of the tubular members and a tapered coupling member.
Figure 3:
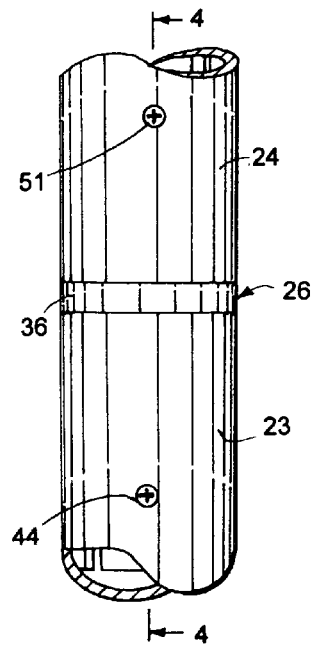
FIG. 3 is an enlarged elevational view of a portion of the tubular members and a straight coupling member.

As shown in FIG. 1, an upright flagpole 20 is connected at its upper end to a flag 21 and anchored at its lower end to ground 22. Flagpole 20 is a pole assembly having a plurality of linear tubular members 23, 24 and 25. Additional tubular members and couplings can be used to increase the height of the flagpole. For example, the flagpole can have three six-foot-long metal four-inch diameter tubular members and two six-foot-long metal three-inch diameter tubular members. The tubular members 23-25 are cylindrical linear aluminum tubes. Tubes of plastic reinforced with fibers can be fabricated into tubular members 23-25. The tubular members have different diameters with the smaller diameter tubular members located at the upper end of flagpole 20. A first coupling member 26 joins adjacent ends of tubular members 23 and 24. A tapered second coupling member 27 joins adjacent ends of tubular members 24 and 25. Coupling members 26 and 27 are biased into surface contact with adjacent ends of the tubular members 23-25 to compensate for dimensional tolerances of the tubular member 23-25 and coupling members 26 and 27. Coupling members 26 and 27 reinforce the adjacent ends of tubular members 23-25 and maintain the upright strength of the flagpole. The tubular members 23-25 and coupling members 26 and 27 are shipped as separate members and assembled at the location of the flagpole.

The lower end of tubular member 23 fits in a cylindrical sand pocket 28 anchored in a concrete plug 29 in ground 22. A cover 30 located around the base of member 23 encloses the top of plug 29. Other types of anchor devices can be used to retain flagpole 20 in an erected position. Flag 21 is connected to a cable 35 located adjacent to the upper end of tubular member 25 with a swivel snap 31 and connected to cable 35 with swivel snap 32 slidably retained on member 25. A cap 33 or halyard revolving truck closes the upper end of tubular member 25. Cable 25 or halyard extends into cap 33 and within flagpole 20 is connected to swivel snaps 31 and 32 and is used to raise lower flag 21. An example of a cable within a flagpole operable to raise and lower a flag is disclosed by L. H. Platt, Jr. in U.S. Pat. No. 3,417,732. Other devices including external cables can be used to retain flag 21 on flagpole 20 and raise and lower the flag.

Figure 4:
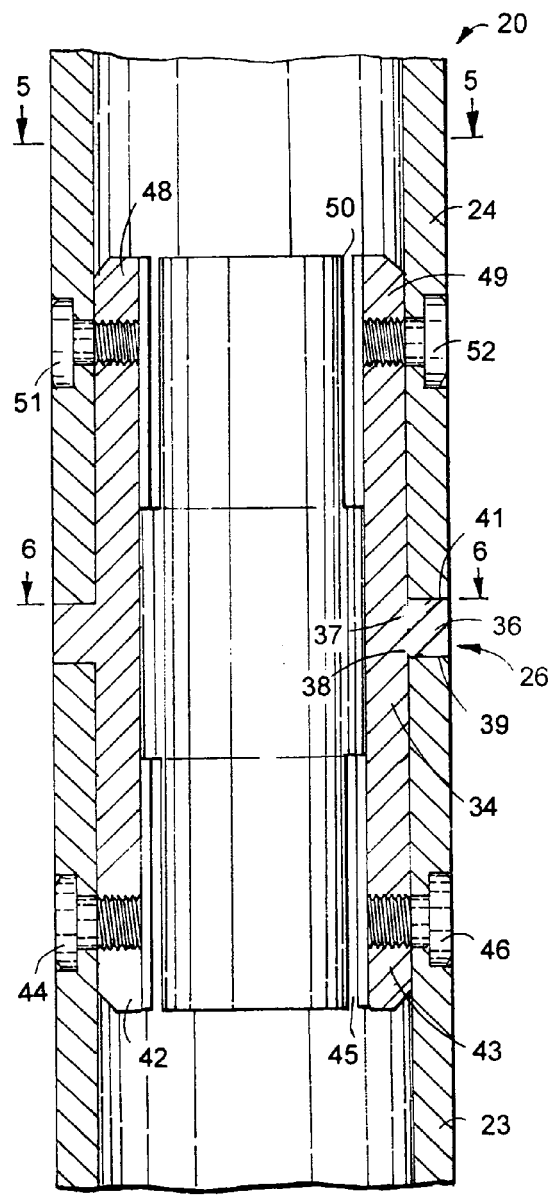
FIG. 4 is an enlarged sectional view taken along the line 4-4 of FIG. 3.
Figure 5:
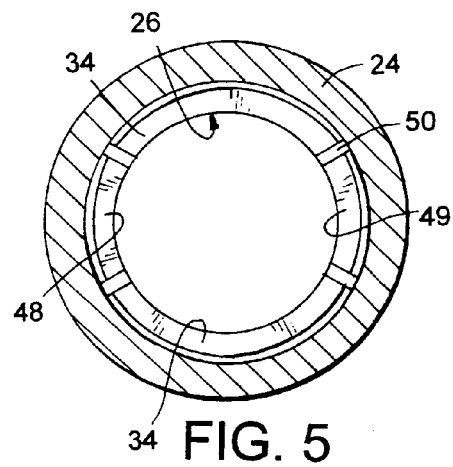
FIG. 5 is a sectional view taken along the line 5-5 of FIG. 4.
Figure 6:
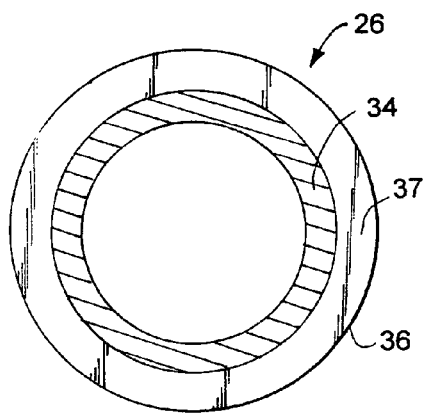
FIG. 6 is a sectional view taken along the line 6-6 of FIG. 4.

As shown in FIGS. 4, 5 and 6, tubular members 23 and 24 are linearly aligned and secured together with coupling member 26. Coupling member 26 comprises a cylindrical sleeve 34 having an outwardly extended annular body or circumferential rib 36. Rib 36 has flat circular upper and lower surfaces 37 and 38 located in surface engagement with the adjacent flat circular ends 39 and 41 of tubular members 23 and 24. Rib 36 functions to limit angular and cocking movements of tubular members 23 and 24. The lower section of coupling member 26 has separated opposite arcuate segments 42 and 43 held in tight surface engagement with fasteners 44 and 46. Linear slots 45 define the width of each of the segments 42 and 43. Fasteners 44 and 46 are shown as bolts threaded into holes in segments 42 and 43. The bolts have heads located in recessed holes in tubular member 23 and threaded bodies located in the threaded holes in segments 42 and 43. Other types of fasteners can be used to secure segments 42 and 43 to tubular member 23. Fasteners 44 and 46 are turned to clamp segments 42 and 43 in tight surface engagement with the inside surface of tubular member 23 thereby compensating for dimensional tolerances of tubular member 23 and coupling member 26. The lower end of coupling member 26 can have additional segments or one segment accommodating fasteners to clamp the segments or segment against the inside wall of tubular member 23. The upper section of coupling member 26 has opposite arcuate segments 48 and 49 located in tight surface engagement with the inside surface of tubular coupling 24. Linear slots 50 define the width of each of the segments 48 and 49. Fasteners 51 and 52 are shown as bolts threaded into holes in segments 48 and 49. The bolts have heads located in stepped holes in coupling member 24 and bodies threaded into the holes in segments 48 and 49. The upper end of coupling member 26 can have additional segments or one segment accommodating fasteners for clamping the segments or segment into tight surface engagement with the inside surface of tubular member 24. The opposite ends of coupling member 26 has chambered outer edges 53 and 54 to facilitate insertion into the adjacent ends of tubular members 23 and 24.

Figures 7, 8, 9:
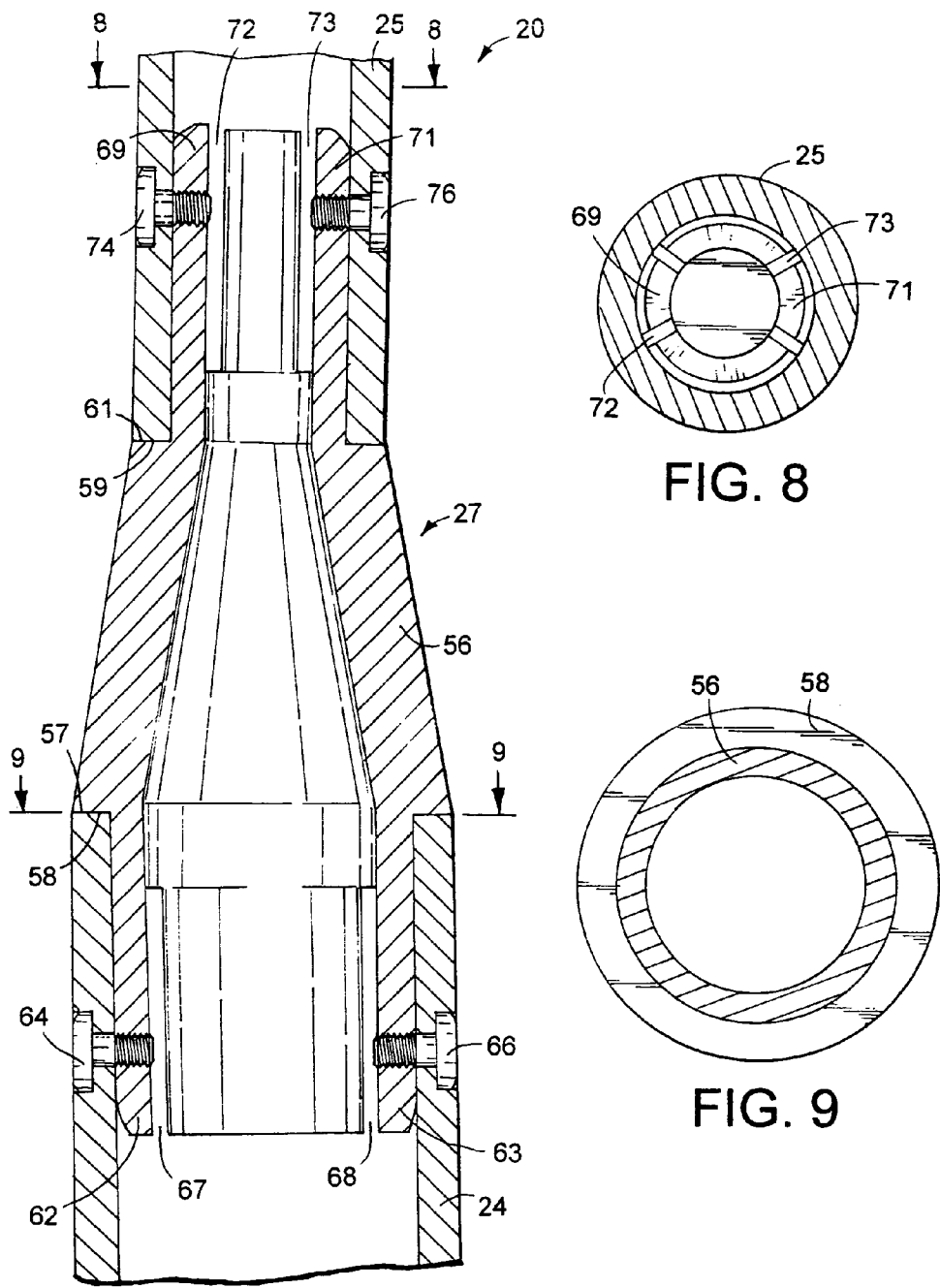
FIG. 7 is an enlarged sectional view taken along the line 7-7 of FIG. 2.
FIG. 8 is a sectional view taken along the line 8-8 of FIG. 7.
FIG. 9 is a sectional view taken along the line 9-9 of FIG. 7.

Tapered coupling member 27, shown in FIGS. 7, 8 and 9, connects large diameter tubular member 24 to small diameter tubular member 25. Coupling member 27 has a cone-shaped body 56 having a large end with a circular shoulder 57 located in surface engagement with the flat circular end 58 of tubular member 24 and a small end with a circular shoulder 59 located in surface engagement with the flat circular end 61 of tubular member 25. The lower section of coupling member 27 has separated opposite arcuate segments 62 and 63 retained in tight surface engagement with the inside surface of tubular member 24 with fasteners 64 and 66. Linear slots 67 and 68 define the width of each of the segments 62 and 63. The fasteners 64 and 66 are bolts threaded into holes in segments 62 and 63 to clamp segments into tight surface engagement with the inside surface of tubular member 24 thereby compensating for dimensional tolerances of tubular member 24 and the lower end of coupling member 27. The upper section of coupler member 56 has separate opposite arcuate segments 69 and 71. The width of each of the segments 69 and 71 is defined by pairs of linear slots 72 and 73 shown in FIG. 8. Fasteners 74 and 76, shown as bolts, clamp segments 69 and 71 in tight surface engagement with the inside surface of tubular member 25 to compensate for dimensional tolerances of the upper end of coupling member 27 and tubular member 25 and secure tubular member 25 to coupling member 27. Fasteners 74 and 76 are threaded into holes in arcuate segments 69 and 71. Fasteners 64, 66, 74 and 76 can be removed from coupler member 27 and tubular members 24 and 25 to allow separation of tubular members 24 and 25 from coupler member 27. As shown in FIG. 7, coupling 27 has an internal passage having a tapered middle section. The passage within coupling 27 can have a uniform internal diameter. Additional segments or a single segment can be used at opposite ends of the coupling member to accommodate fasteners to attach the coupling member to tubular members 24 and 25. The lengths of tubular members 23, 24 and 25 and coupling members 26 and 27 allow flagpole 20 to be shipped as separate members and assembled at its display location.

A first modification of the flagpole of FIG. 1, shown in FIGS. 10 to 12, has an upright pole assembly 120 comprising a plurality of linear tubular members 121, 122 and 123 joined together in end-to-end relationship. Tubular members 121, 122 and 123 are linear aluminum tubes or pipes. The lower end of tubular member 121 is inserted into a sand pocket 124 anchored to a concrete plug 126 in ground 127. A cover 130 is located on top of plug 126. A flag 128 is attached to swivel snaps 129 and 131 located adjacent the upper tubular member 123. A cap 132 mounted on top of tubular member 123 closes the open top end of tubular member 123. A cable 135 or cord within pole 120 connected to swivel snap 129 is used to raise and lower flag 128. An example of a cable within a flagpole used to raise and lower a flag is disclosed by L. H. Platt, Jr. in U.S. Pat. No. 3,417,732. External cables can be used to retain flag 128 on pole 123 and raise and lower the flag.

As shown in FIGS. 11 and 12, the lower end of tubular member 122 is inserted into the upper end of tubular member 121 and retained with fasteners 133 and 134. Fasteners 133 and 134 shown as bolts threaded into holes 136 and 137 in arcuate segments 138 and 139 clamp segments 138 and 139 into tight surface engagement with opposite portions of the inside wall of the upper end of tubular member 121. Pairs of linear slots 141 and 142 define the width of each of segments 138 and 139. Fasteners 133 and 134 have heads located in recessed holes 143 and 144 in tubular member 121. In use, fasteners 133 and 134 threaded into holes 136 and 137 bias and flex segments 138 and 139 into tight surface engagement with the inside wall of tubular member 122 thereby preventing lateral and swinging movements of tubular member 122 relative to tubular member 121. Tubular members 122 and 123 are connected with fasteners 146 according to the structure shown in FIGS. 11 and 12.

A second modification of the flagpole of FIG. 1, shown in FIGS. 13 to 22, has an upright pole assembly 200 comprising a plurality of linear tubular members 223, 224 and 225 joined together in end-to-end relationship with coupling members 226 and 227. Tubular members 223-225 are linear aluminum tubes joined together with metal couplings 226 and 227. Tubular member 225 has an outside diameter that is smaller than the outside diameter of tubular member 224. For example, tubular member 225 can be an aluminum three-inch diameter tube and tubular member 224 can be an aluminum four-inch diameter tube. Additional tubular members and couplings can be used to increase the height of the flagpole.

The lower end of tubular member 223 is anchored in an upright sand pocket 228 in a concrete plug 229. Plug 229 extends downwardly into ground 222. A cone-shaped cover 230 surrounds tubular member 223 to enclose the top of pocket 228 and plug 229. Other types of anchor devices can be used to retain flagpole 200 in an erected position.

Flag 221 located adjacent the upper end of tubular member 225 is attached with a swivel snap 231 to a halyard or steel cable 234. The lower end of cable 234 extends downwardly to a second swivel snap 232. Swivel snaps 231 and 232 extend through eyelets in opposite ends of the header of the flag. A beaded retainer ring located around tubular member 225 and connected to swivel snap 232 allows the flag 221 to be lowered. A neoprene coated counterweight connected to swivel snap 232 biases cable 234 in a downward direction to facilitate lowering of the flag. The upper end of cable 234 is trained over a pulley within cap 223 or concealed halyard revolving truck. Cable 234 extends downwardly within tubular members 223-235 to a winch located within the bottom of tubular member 223. A removable crank handle is used to wind and unwind cable 234 onto and off the winch to selectively raise and lower flag 221. An example of a cable within a flagpole operable to raise and lower a flag is disclosed by L. H. Platt Jr. in U.S. Pat. No. 3,417,732.

Figure 16:
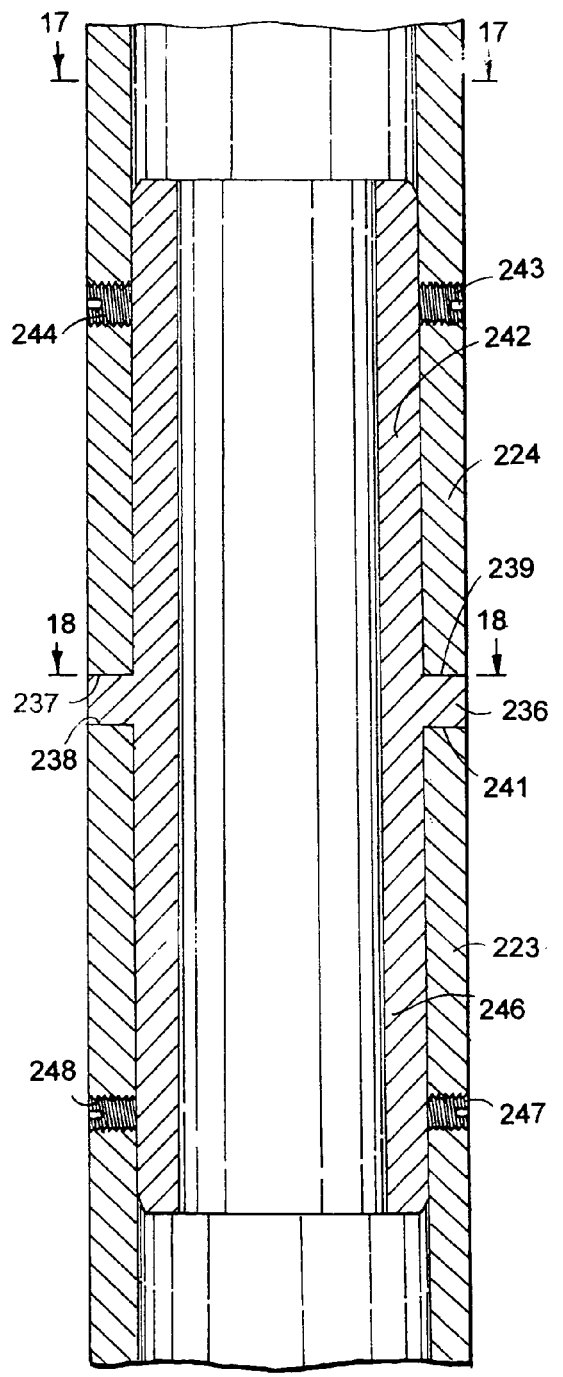
FIG. 16 is an enlarged sectional view taken along the line 16-16 of FIG. 15.
Figure 17:
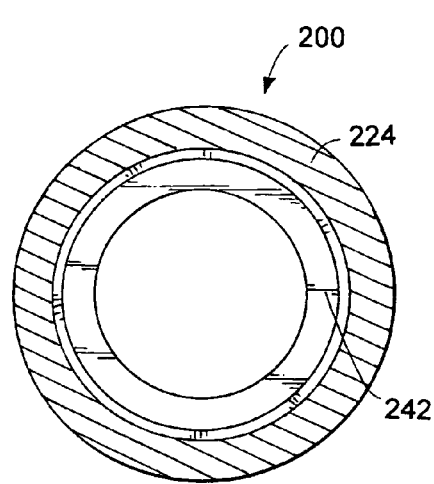
FIG. 17 is a sectional view taken along the line 17-17 of FIG. 16.
Figure 18:
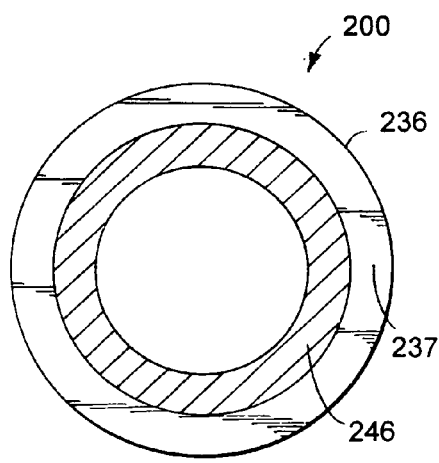
FIG. 18 is a sectional view taken along the line 18-18 of FIG. 16.

As shown in FIGS. 15 and 16, coupling 226 is connected to adjacent ends of tubular members 223 and 224 to retain tubular members 223 and 224 in axial end-to-end alignment. An annular rib 236 having flat circular upper and lower surfaces 237 and 238 located in flat surface engagement with the flat circular ends 239 and 241 of tubular members 223 and 224 limit angular and cocking movements of tubular members 223 and 224. Coupling 226 has a cylindrical sleeve with upper and lower sections 242 and 246 located in firm surface engagement with the inside cylindrical walls of tubular members 223 and 224. Fasteners comprising a first pair of set screws 243 and 244 threaded into holes in tubular member 224 bear against opposite sides of upper section 242 of the sleeve. A second pair of set screws 247 and 248 threaded into holes in tubular member 223 bear against opposite sides of the lower section 246 of the sleeve. Set screws 243, 244, 247 and 248 are releasable fasteners that prevent axial separation of tubular members 223 and 224 from coupling 226, rotation of tubular members 223 and 224 on coupling 226 and maintain the ends 239 and 241 in tight engagement on rib 236 and allow erection of the flagpole at its use location.

Figure 19:
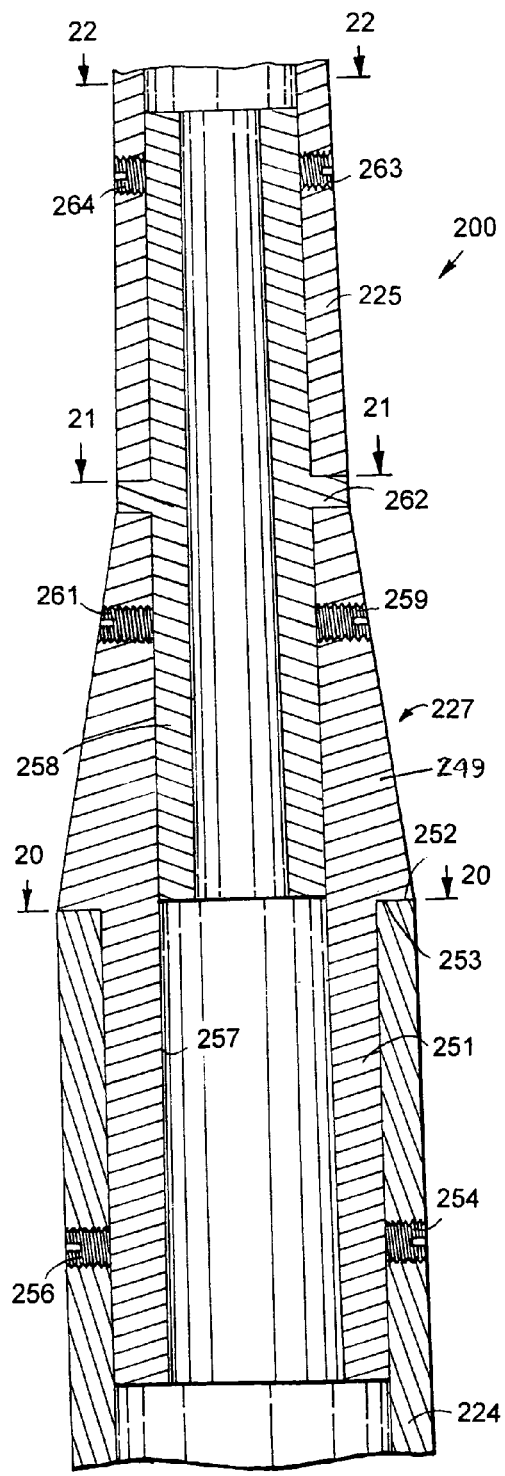
FIG. 19 is an enlarged sectional view taken along the line 19-19 of FIG. 14.
Figure 22:
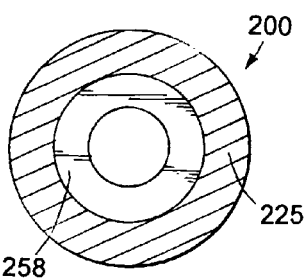
FIG. 22 is a sectional view taken along the line 22-22 of FIG. 19.
Figure 21:
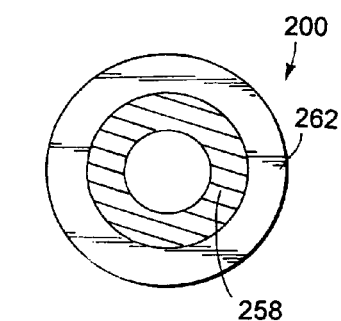
FIG. 21 is a sectional view taken along the line 21-21 of FIG. 19.
Figure 20:
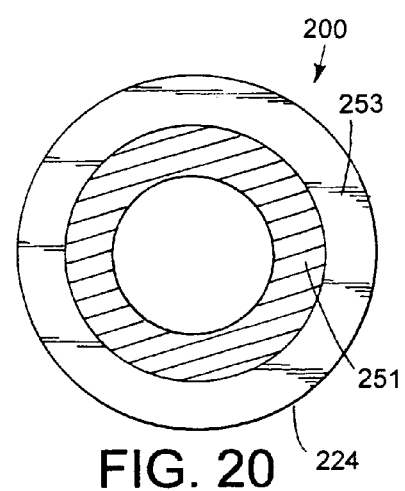
FIG. 20 is a sectional view taken along the line 20-20 of FIG. 19.

Tapered coupling member 227, shown in FIGS. 13 and 19 to 22, connects in end-to-end relation large diameter tubular member 224 to smaller diameter tubular member 225. Coupling member 227 has a cone shaped body 249 joined to a downward extended cylindrical member 251. Body 249 and member 251 has a common cylindrical inside wall 257. Member 251 is telescoped into the upper end of tubular member 224 with cylindrical member 251 in surface engagement with the inside cylindrical wall of tubular member 224. Body 249 has a large diameter end having a circular flat shoulder 252 located in surface engagement with the flat circular end 253 of tubular member 224. Fasteners, shown as set screws 254 and 256 threaded through holes in opposite sides of tubular member, engage member 251 and retain shoulder 252 against circular end 253 of tubular member 224 and prevent axial and rotational movements of coupling 227 relative to tubular member 224. A cylindrical sleeve 258 has a lower section telescoped into body 249. Sleeve 258 has an outer cylindrical wall located in firm surface engagement with the inside cylindrical wall 257 of body 249. Fasteners, shown as set screws 259 and 251 threaded through holes in body, contact opposite sides of sleeve 250 and retain a rib 262 joined to sleeve 248 in tight surface engagement with the flat upper or small end of body 249 and prevent axial and rotational movements of sleeve 258 relative to body 259. As shown in FIGS. 19 and 22, the lower end of tubular member 225 is telescoped over the upper end of sleeve 258. The outside cylindrical wall of sleeve 258 is located in firm surface engagement with the cylindrical inside wall of tubular member 225. The lower end of tubular member 225 is located in surface engagement with rib 262. Fasteners, shown as set screws 263 and 264 threaded through holes in tubular member 225, contact opposite sides of sleeve 258 and retain tubular member 225 in firm engagement with rib 262 and prevent axial and rotational movements of tubular member 225 relative to sleeve 258. The lengths of tubular members 223-225, coupling members 226 and 227, and the fasteners allow all the parts of the flagpole to be shipped to the flagpole erection site by conventional transport services. The flagpole is assembled in a horizontal position and raised to an upright position as a unit and set into plug 229 which maintains the flagpole in its upright position.

The pole assembly disclosed herein is a simple and novel construction having separate members that can be transported to an erection site and quickly and easily assembled in a minimum of time and labor. The erected pole assembly is strong and has a long service life. Changes in structures and arrangement of structures and materials can be made by persons skilled in the art without departing from the scope of the invention.

The invention claimed is:

1. A pole assembly comprising: a plurality of first linear tubular members each having end portions, an inside wall and an outside diameter, a first coupling member connected to adjacent opposite end portions of the first linear tubular members to secure the first adjacent tubular members together in end-to-end relationship, first fasteners radially extending through the inside walls of the first linear tubular members and engageable with the first coupling member to retain the first linear tubular members on the first coupling member, the first coupling member including a first cylindrical member extended into adjacent end portions of adjacent first linear tubular members and an outwardly extended annular rib joined to the first coupling member cylindrical member, said adjacent end portions of the first linear tubular members being located in surface engagement with the first coupling member first cylindrical member, and said end portions of the first linear tubular members having ends engageable with said annular rib, said first fasteners being in contact with the first coupling member cylindrical member to retain the adjacent first linear tubular members on the first coupling member cylindrical member with the ends of the first linear tubular members engageable with said rib, a second linear tubular member having an outside diameter smaller than the outside diameter of the first linear tubular members, an end portion having an inside cylindrical wall and an annular end, a second coupling member and a sleeve connecting one end portion of one of the first linear tubular members to the end of the second linear tubular member, said second coupling member including a body having a cone-shaped outside wall, a cylindrical inside wall surrounding a passage, an annular shoulder in engagement with said one end portion thereof of the first linear tubular members and an annular end opposite the annular shoulder and having the same outside diameter as the second tubular member, a second cylindrical member joined to the body telescoped into the one end portion of said one of the first linear portion of said one of the linear tubular members and located in cylindrical surface engagement with the inside wall of said one of the tubular members, an outwardly extended annular rib joined to the sleeve of the second coupling member and having the same outside diameter as the second tubular member, said annular end of the body being engageable with the rib on the sleeve and said end of the second linear tubular member being engageable with said rib on the sleeve, second fasteners radially extending through the inside wall of the one end portion of said one of the first linear tubular members engageable with the cylindrical member of the second coupling member to hold the one end portion of said one of the first linear tubular member on the cylindrical member of the second coupling member and retain the annular end portion of said one of the tubular members in engagement with said shoulder of the body, said sleeve having a first cylindrical portion extending into the body and located in cylindrical surface engagement with said inside wall of the body and a second cylindrical portion extended into the end portion of the second tubular member and located in cylindrical surface engagement with the inside cylindrical wall of the second tubular member, third fasteners radially extending through the inside wall of the body and engageable with the first portion of the sleeve to hold the sleeve on the body and retain the annular end of the body in engagement with the rib, and fourth fasteners radially extending through the inside wall of the second tubular member engageable with the second portion of the sleeve to hold the second tubular member on the sleeve and retain the annular end of the second tubular member in engagement with the rib on the sleeve.

2. The pole assembly of claim 1 wherein: the first and second tubular members are elongated linear aluminum tubes.

3. The pole assembly of claim 1 wherein: the first fasteners comprise screws threaded in holes in the end portions of the first tubular members and engageable with the first coupling member to hold the first tubular members on the first coupling member, said second fasteners comprise screws threaded in holes in said one of the first tubular members and engageable with the cylindrical member of the second coupling member, said third fasteners comprising screws threaded into holes in the body and engageable with the first portion of the sleeve to hold the sleeve in the body, and said fourth fasteners comprising screws threaded into holes in the second tubular member and engageable with the second portion of the sleeve to hold the second tubular member on the sleeve.

4. The pole assembly of claim 1 wherein: the annular shoulder of the body is larger in diameter than the annular end of the second tubular member.

5. A pole assembly comprising: a first tubular member having an annular end surrounding an open end portion, an inside cylindrical wall and an outside cylindrical wall having a first diameter, a second tubular member having an annular end surrounding an open end portion, an inside cylindrical wall and an outside cylindrical wall having a second diameter smaller than the first diameter of the first tubular member, a coupling assembly including a body having cone-shaped outside wall, an inside cylindrical wall surrounding a passage and a cylindrical member joined to the body telescoped into the open end portion in cylindrical surface engagement with the inside cylindrical wall of the first tubular member, at least one first fastener radially extending through the inside wall of the first tubular member engageable with the member joined to the body to hold the first tubular member on the member joined to the body, a sleeve having a first cylindrical portion extended into the passage of the body in cylindrical surface engagement with the inside wall and a second cylindrical portion extended into the open end portion in cylindrical surface engagement with the inside cylindrical wall of the second tubular member, said cone-shaped body having an annular shoulder retained in engagement with the annular end of said first tubular member with the first fastener, an outwardly extended annular rib joined to the sleeve and having the same outside diameter as the second tubular member, said body having an annular end opposite the shoulder engageable with the rib on the sleeve and having the same outside diameter as the second tubular member and said second tubular member having its annular end engageable with the rib, at least one second fastener radially extending through the inside wall of the body engageable with the first portion of the sleeve to hold the sleeve in the body and the annular end of the body in engagement with the sleeve, and at least one third fastener radially extending through the inside wall of the second tubular member engageable with the second portion of the sleeve to hold the second tubular member on the sleeve and the annular end of the second tubular member in engagement with the rib of the sleeve.

6. The pole assembly of claim 5 wherein: the annular shoulder of the body is larger in diameter than the annular end of the body.

7. The pole assembly of claim 5 wherein: said first, second and third fasteners are screws.

8. A pole assembly comprising: a first tubular member having an annular end surrounding an open end portion and an inside cylindrical wall, a second tubular member having an annular end surrounding an open end portion and an inside cylindrical wall, a coupling assembly including a body having an annular shoulder, an inside cylindrical wall surrounding a passage and a cylindrical member joined to the body telescoped into the open end portion of the first tubular member and located in cylindrical surface engagement with the inside cylindrical wall of the first tubular member, at least one first fastener radially extending through the inside wall of the first tubular member engageable with the member joined to the body to hold the first tubular member on the member joined to the body and its annular end in engagement with the shoulder of the body, a sleeve having a first portion extended into the passage of the body and located in cylindrical surface engagement with the inside wall of the body and a second cylindrical portion extended into the open end portion of the second tubular member and located in surface engagement with the inside cylindrical wall of the second tubular member, an outwardly extended annular rib joined to the sleeve and having the same outside diameter as the second tubular member, said body having an annular end opposite the shoulder engageable with the rib on the sleeve and having the same outside diameter as the second tubular member, said second tubular member having its annular end engageable with the rib, at least one second fastener radially extending through the inside wall of the body engageable with the first portion of the sleeve to hold the sleeve on the body and retain the annular end of the body in engagement with the rib, and at least one third fastener radially extending through the inside wall of the second tubular member engageable with the second portion of the sleeve to hold the second tubular member on the sleeve and retain the annular end of the second tubular member in engagement with the rib.

9. The pole assembly of claim 8 wherein: the annular shoulder of the body is larger in diameter than the annular end of the body.

10. The pole assembly of claim 8 wherein: said first, second and third fasteners are screws.

\* \* \* \* \*